United States Patent
Nakatsuka et al.

(10) Patent No.: US 8,305,434 B2
(45) Date of Patent: Nov. 6, 2012

(54) PHOTOGRAPHING APPARATUS AND MICROSCOPE SYSTEM

(75) Inventors: Masayuki Nakatsuka, Tokyo (JP); Hiroshi Fujiki, Tokyo (JP)

(73) Assignee: Olympus Corporation, Tokyo (JP)

( * ) Notice: Subject to any disclaimer, the term of this patent is extended or adjusted under 35 U.S.C. 154(b) by 249 days.

(21) Appl. No.: 12/771,256

(22) Filed: Apr. 30, 2010

(65) Prior Publication Data

US 2010/0309305 A1    Dec. 9, 2010

(30) Foreign Application Priority Data

Jun. 8, 2009  (JP) ................. 2009-137056

(51) Int. Cl.
- *H04N 5/228* (2006.01)
- *H04N 5/243* (2006.01)
- *H04N 9/47* (2006.01)
- *G03B 17/00* (2006.01)

(52) U.S. Cl. ............ 348/79; 348/80; 396/432; 382/128; 382/276; 359/383

(58) Field of Classification Search .............. 348/79, 348/80; 396/432; 382/128, 276; 359/383
See application file for complete search history.

(56) References Cited

U.S. PATENT DOCUMENTS

| | | | | |
|---|---|---|---|---|
| 7,199,823 B2* | 4/2007 | Masuyama | ............... | 348/229.1 |
| 7,279,671 B2* | 10/2007 | Kishida | ............... | 250/208.1 |
| 7,465,908 B2* | 12/2008 | Kishida | ............... | 250/201.3 |
| 7,949,161 B2* | 5/2011 | Kawanabe et al. | ............ | 382/128 |
| 8,102,418 B2* | 1/2012 | Kojima | ............... | 348/80 |
| 2002/0191086 A1 | 12/2002 | Masuyama | | |
| 2006/0171023 A1* | 8/2006 | Kishida | ............... | 359/368 |
| 2007/0285768 A1* | 12/2007 | Kawanabe et al. | ............ | 359/372 |
| 2008/0043469 A1* | 2/2008 | Watanabe et al. | ............. | 362/257 |
| 2008/0140317 A1* | 6/2008 | Fujiyoshi | ............... | 702/1 |
| 2009/0296203 A1* | 12/2009 | Kojima | ............... | 359/363 |

FOREIGN PATENT DOCUMENTS

| | | |
|---|---|---|
| JP | 2004-104561 | 4/2004 |
| JP | 2004-304252 | 10/2004 |
| JP | 2004-304652 | 10/2004 |
| JP | 2008-035391 | 2/2008 |
| JP | 2008-139796 | 6/2008 |

OTHER PUBLICATIONS

"Electronic Imaging Detectors", Internet Citation, Jun. 15, 2008, XP007913931, http://web.archive.org/web/20080615134644/ http://www.olympusmicro.com.html, pp. 1-11.

Extended European Search Report dated Jul. 23, 2010, pp. 1-9.

* cited by examiner

*Primary Examiner* — Haresh N Patel

(74) *Attorney, Agent, or Firm* — Scully, Scott, Murphy & Presser, P.C.

(57) ABSTRACT

A photographing control unit comprising a drive signal generator, an analog front end, a synchronization signal generation unit, and a system control unit controls an imager under a predetermined photographing condition, so that the imager photographs an observation image of a sample observed by a microscope and formed on a light receiving surface of the imager. A computing unit obtains inputs of a plurality of photographing parameters, determines a photographing condition based on the obtained photographing parameters, and sets the photographing condition for the photographing control unit. A display unit displays the designable ranges of the photographing parameters. Here, when the computing unit obtains the input of a priority parameter, it changes the designable range of the plurality of photographing parameters other than the priority parameter based on the priority parameter and causes the display unit to display the designable range after the change.

8 Claims, 12 Drawing Sheets

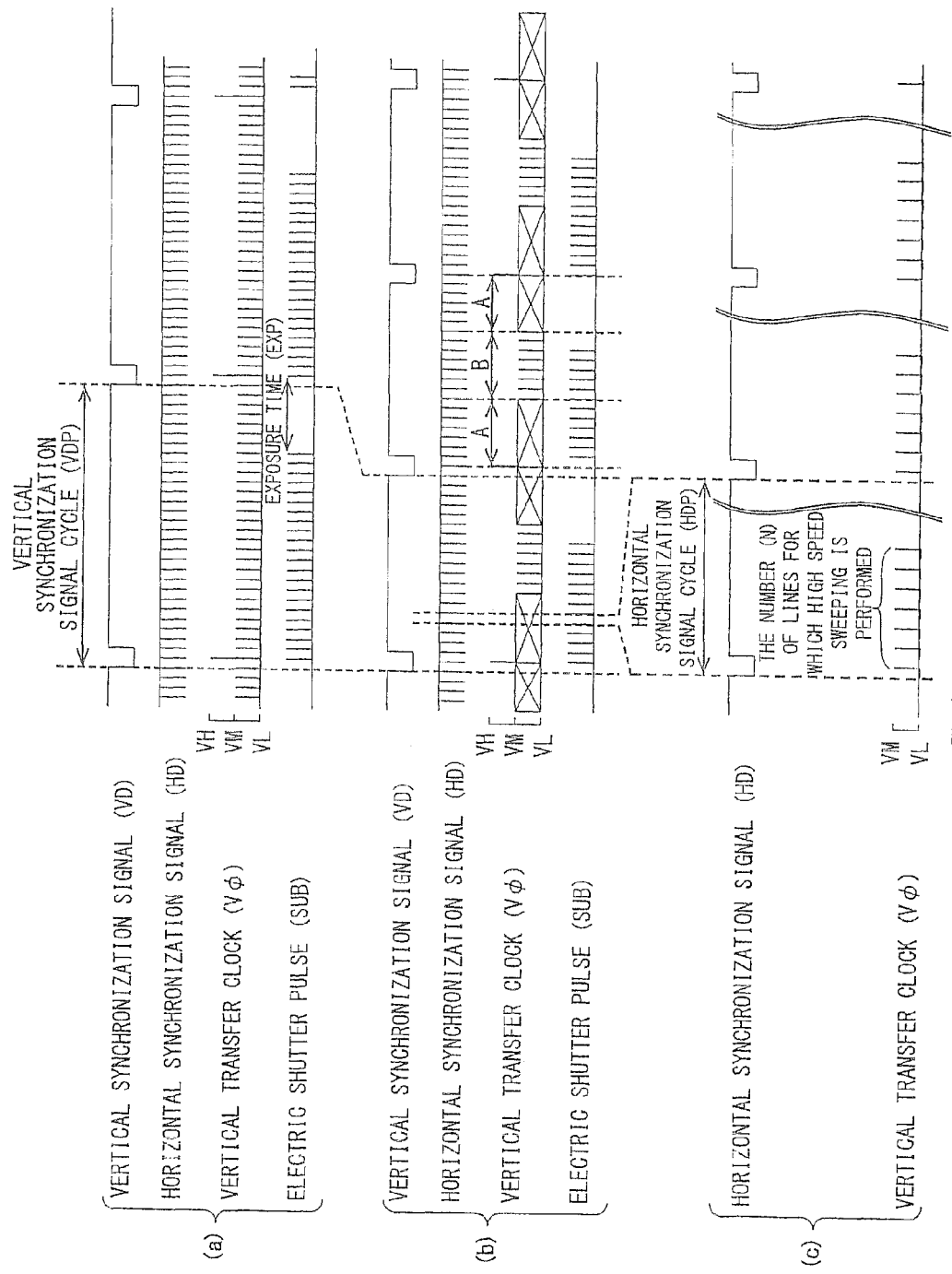
F I G. 2

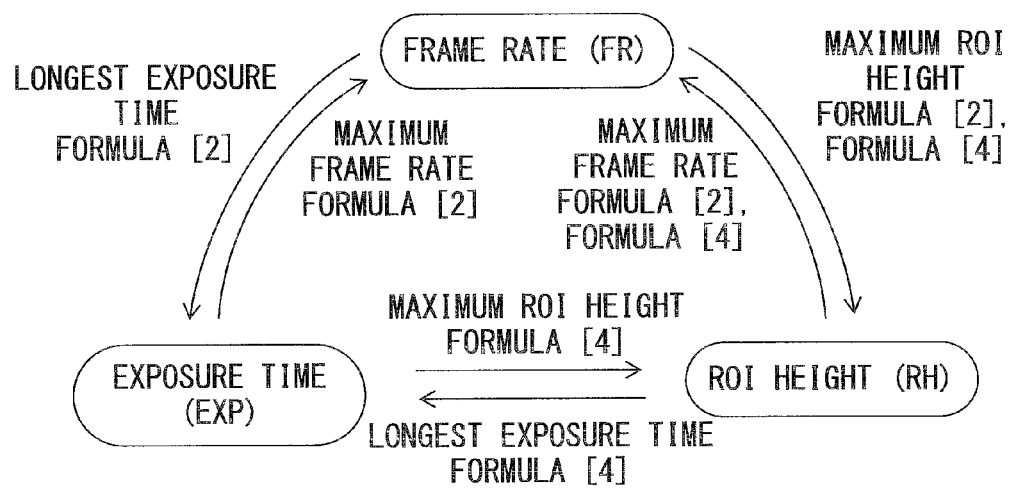
F I G. 3

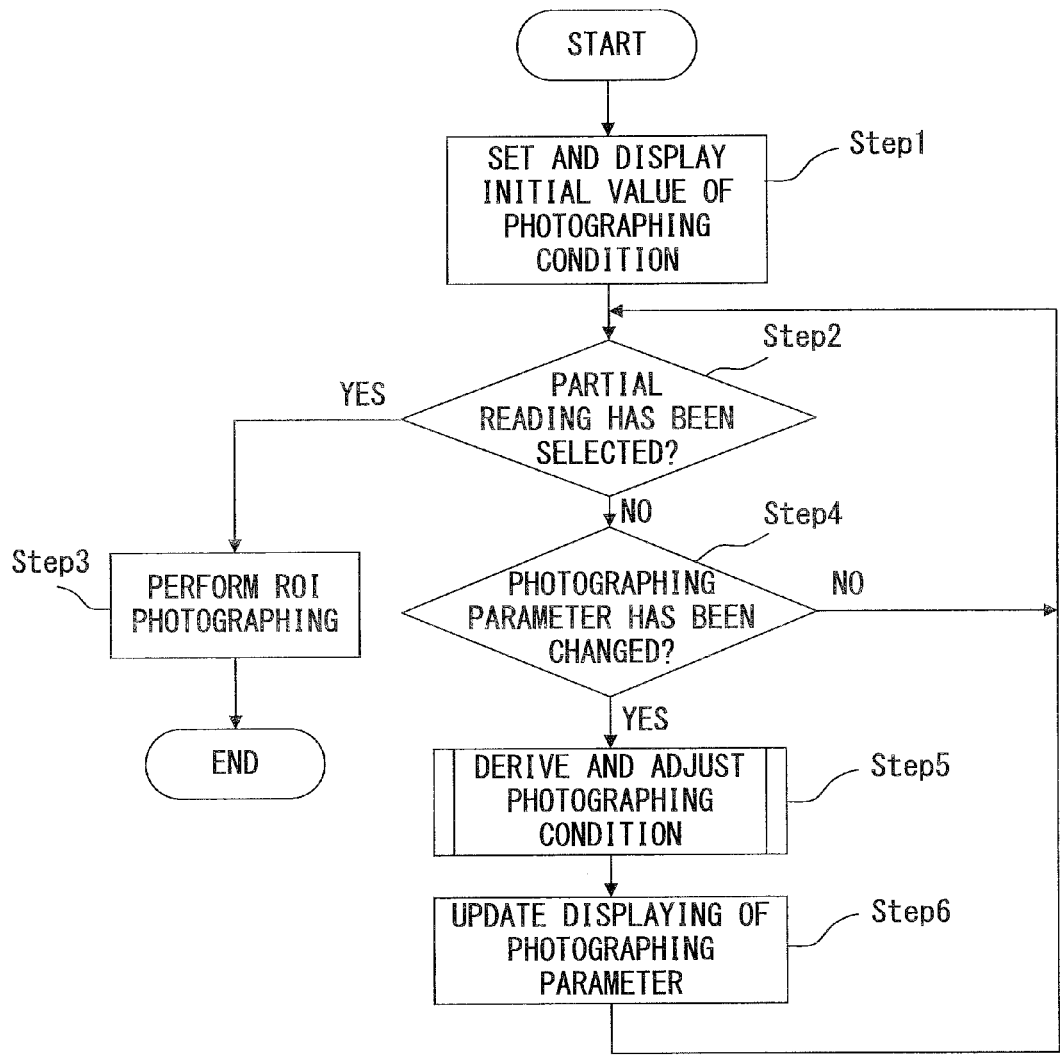
F I G. 5

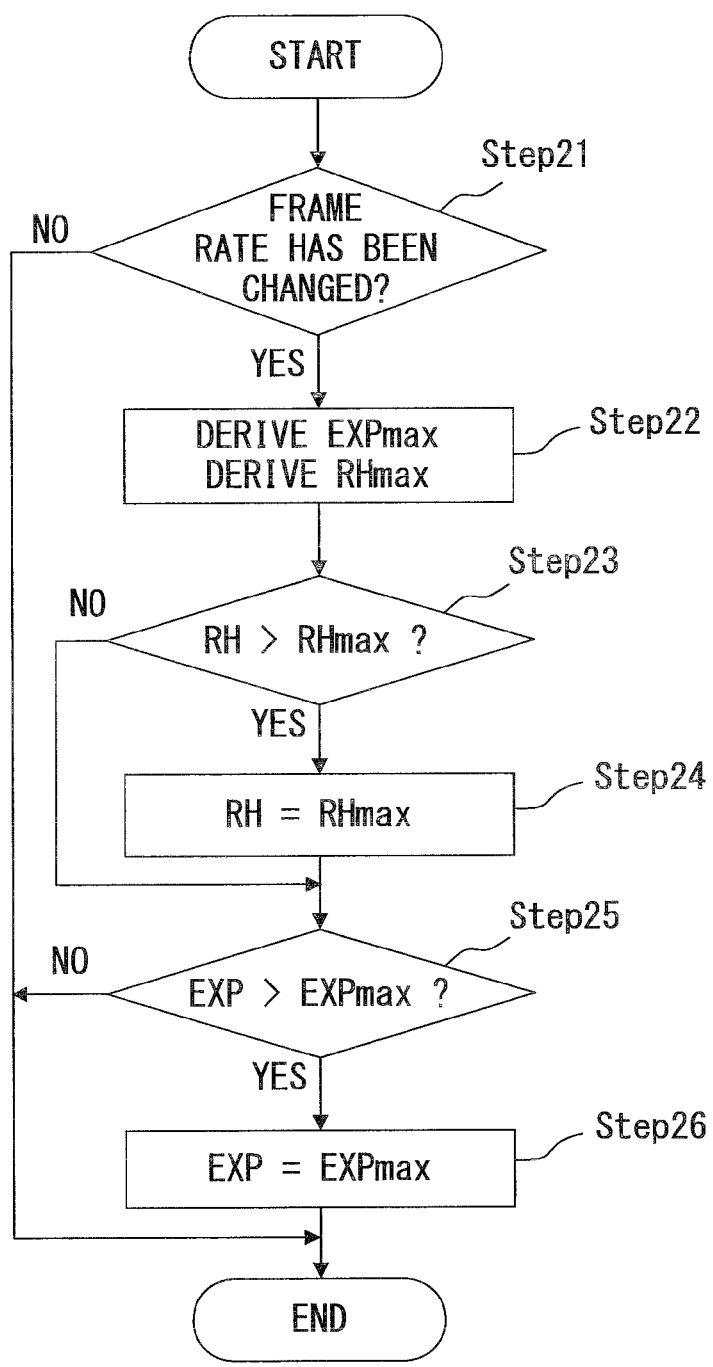
F I G. 7

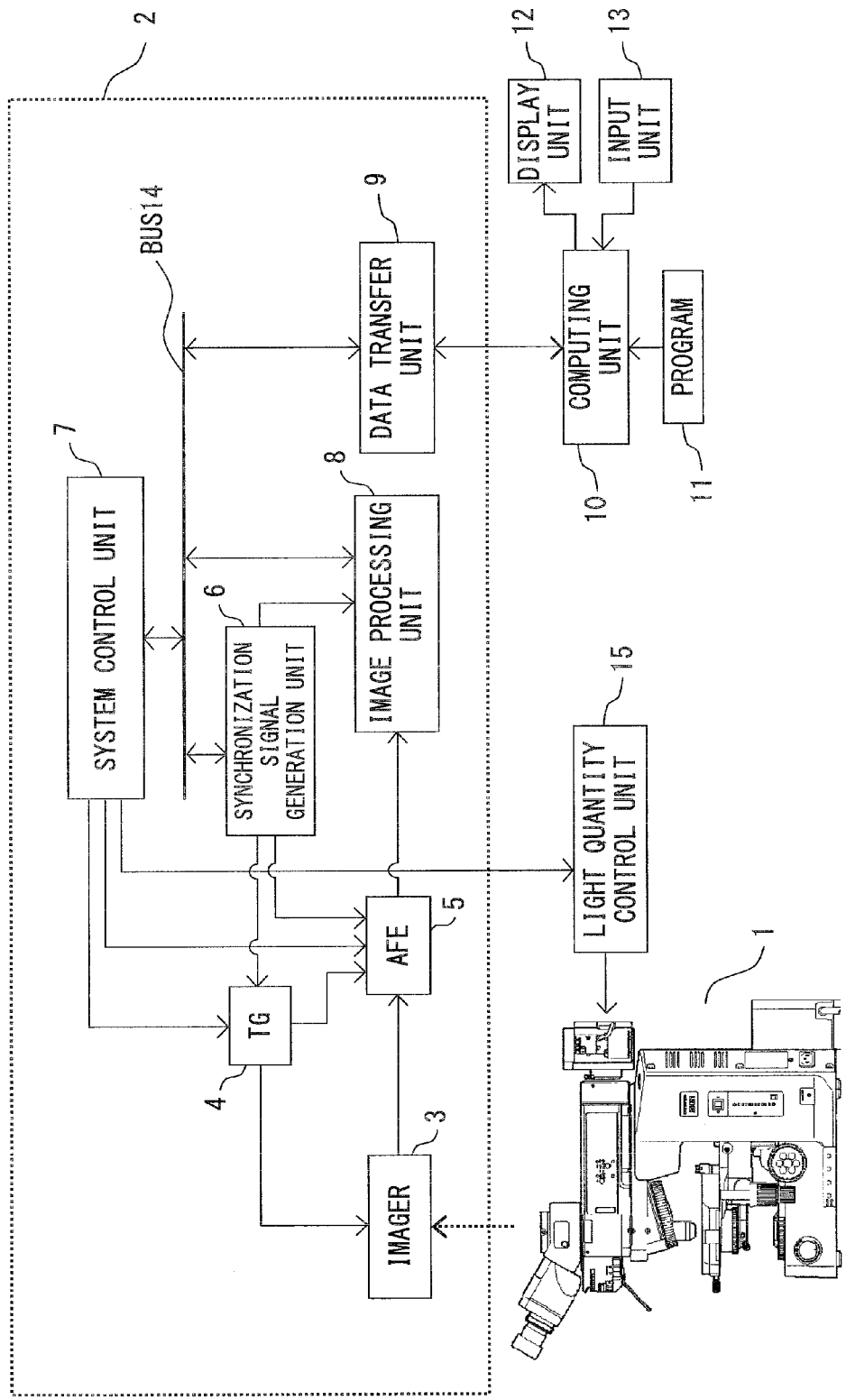
F I G. 8

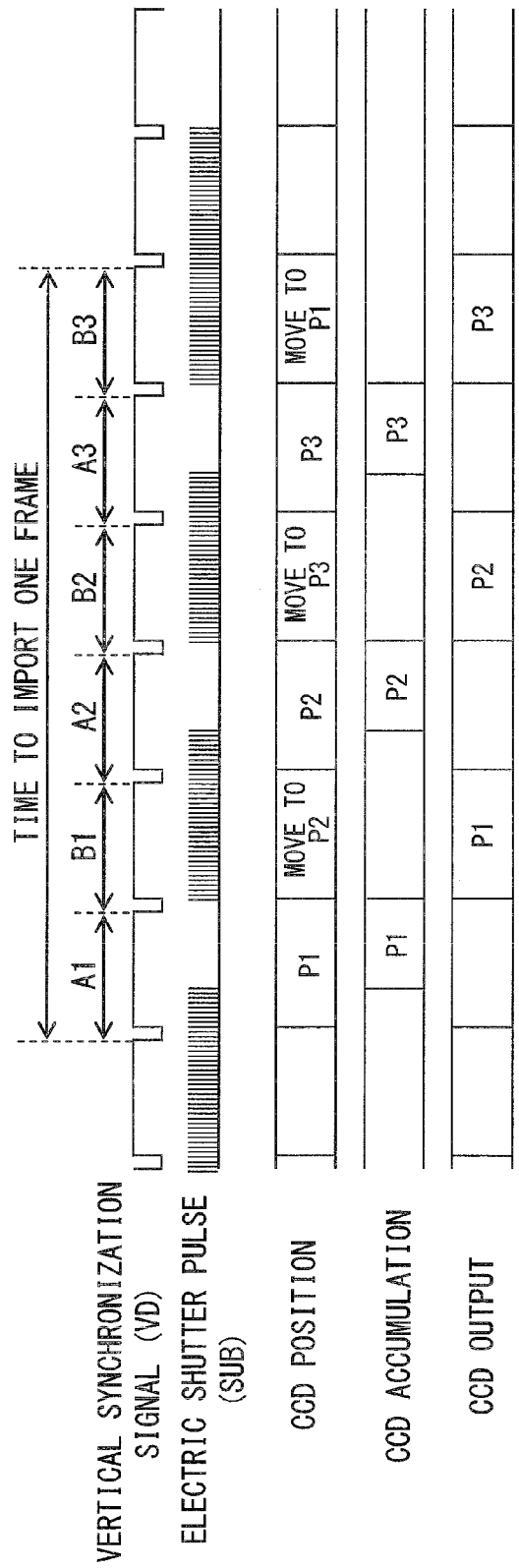
F I G. 1 2

PHOTOGRAPHING APPARATUS AND MICROSCOPE SYSTEM

CROSS-REFERENCE TO RELATED APPLICATIONS

This application claims benefit of Japanese Application No. 2009-137056, filed Jun. 8, 2009, the contents of which are incorporated by this reference.

BACKGROUND OF THE INVENTION

1. Field of the Invention

The present invention relates to a photographing technology, and particularly to the technology of a photographing apparatus for a microscope which is suitable for observing rapid aging of a sample.

2. Description of the Related Art

In the field of physiology, it is required that rapid aging of a sample be captured when a dynamic state of the sample, a reaction caused by an optical or electrical stimulus, or the like is observed using a photographing apparatus for a microscope and when such an image is recorded. In order to meet such a requirement, there is a photographing apparatus with a partial reading function that does not read electric charges, generated from an imager via a photoelectric conversion, from pixels in the entire region of the light receiving surface but reads them from only a portion of the region, so as to achieve a high frame rate. This partial reading function is also called partial scanning, sub array reading, ROI (Region Of Interest) reading, and the like.

As representative imagers, a CMOS (Complementary Metal Oxide Semiconductor) image sensor and CCD (Charge Coupled Device) image sensor have been introduced. Of these imagers, a CMOS image sensor can directly specify and output an electric charge generated by each pixel on a light receiving surface by means of an XY address technique; therefore, partial reading can be easily achieved. Meanwhile, although due to its structure a CCD image sensor cannot randomly access and output an electric charge generated by each pixel on a light receiving surface, substantial partial reading is made possible by devising a method for driving this image sensor.

In regard to a partial reading technique via such a CCD image sensor, some techniques are conventionally proposed.

For example, Japanese Laid-open Patent Publication No. 2004-104561 describes a technology of partial reading by a CCD image sensor, which is performed via high-speed sweeping. In regard to normal reading, when a charge transport corresponding to one horizontal line on an imager is completed, the imager is shifted by one vertical line. In regard to high-speed sweeping, by contrast, when the transport above is completed, line shifting corresponding to a plurality of lines is performed and electric charges corresponding to the plurality of lines are mixed and swept out. In this technology, time spent on reading non-ROI regions is shortened by performing normal reading for a region for which partial reading is performed (e.g. ROI) and by performing high-speed sweeping for the other regions, so that the frame rate is improved.

As another example, Japanese Laid-open Patent Publication No. 2004-304652 proposes a technology of reading an image signal from a CCD image sensor so as to improve a frame rate. In this technology, before completing the output of electric charges corresponding to one frame of a certain image, electric charges are output for the subsequent frame, so that reading is performed on the basis of the cycle of a vertical synchronization signal which needs fewer horizontal scan lines than when normal reading is performed.

As another example, Japanese Laid-open Patent Publication No. 2008-35391 discloses a technology for enhancing the output rate of image data from a CCD image sensor so as to improve the frame rate. In this technology, before all of the electric charges corresponding to one horizontal line on the CCD image sensor are transported, the CCD image sensor is vertically shifted, so that electric charges of unnecessary regions are mixed.

Assume, for example, that a user observes a dynamic state of a sample in detail and that in order to record the image of this sample, this user photographs the image of this sample at a frame rate desired by the user. In this situation, if the desired frame rate is higher than the frame rate for the all-pixel reading operation (i.e., a reading operation performed over pixels of the entire region of the light receiving surface of an imager), this desired frame rate can be achieved using a partial reading function. However, the relationship between the partial reading region and the frame rate depends on the configuration and operation of the apparatus, such as the kind of imager and its driving method. Therefore, the user cannot find out if it is possible to perform photographing at the frame rate above without actually performing photographing by means of a partial reading function.

Assume, for example, a photographing apparatus for a microscope which has, as an imager, a CCD image sensor whose pixel number is 1360 [pixels] (horizontal)×1024 [pixels] (vertical) and whose transfer cycle for one horizontal line is 64 [μsec]. If 32 [bit] of RAW images (raw data images) are output from the photographing apparatus when the exposure time is 10 [msec], the maximum frame rate will be 15 [fps] since about 66 [msec] are needed to read one image frame.

Also assume that the partial region of, for example, 1360 [pixels] (horizontal)×300 [pixels] (vertical) in the RAW image is output via the partial reading based on high-speed sweeping (7 lines are assumed to be swept away). In this situation (the details will be described later), about 26 [msec] will be needed to read one image frame and the maximum frame rate will be 38 [fps].

Also assume that, for example, USB 2.0 (transfer rate: about 480 Mbps) of the USB (Universal Serial Bus) standard, which is one of the serial bus standards, is used when image data photographed by the photographing apparatus for a microscope is transferred to a PC. In this situation, the frame rate of an RAW image is limited to 10 [fps] at most due to the transfer rate of a transfer path; and if the partial reading described above is used, the frame rate of an image is limited to 36 [fps] at most.

As described above, some photographing parameters indicative of various conditions at the time of photographing an image may have a mutual relationship, such as a relationship between a frame rate and the size of a partial reading region.

Therefore, when, for example, a certain parameter is fixed depending on a user's request, the settable range for other photographing parameters may be constrained due to the fixing. As described above, there may be a restraint condition between photographing parameters having a mutual relationship.

As described above, this restraint condition depends on the apparatus configuration, such as the kind of an imager used, a method used for reading accumulated electric charges from the imager, and the transfer rate of an image data transfer path; therefore, it is difficult for the user to estimate the combination of settable photographing parameters before photographing is performed. Thus, until the setting of a desired photographing condition or photographing condition closest to the desired condition is found for a photographing apparatus, the user needs to repeatedly adjust a plurality of photographing parameters and repeatedly perform photographing (i.e., test photographing). It is very troublesome to set a photographing condition.

SUMMARY OF THE INVENTION

A photographing apparatus according to one aspect of the present invention includes: a photographing control unit controlling an imager under a predetermined photographing condition so as to photograph the image of a sample observed via a microscope and formed on the light receiving surface of the imager; a setting unit obtaining the input of a plurality of photographing parameters, determining a photographing condition on the basis of the obtained photographing parameters, and setting this condition for the photographing control unit; a display unit displaying designable ranges of the photographing parameters; a designable range changing unit changing designable ranges of the plurality of photographing parameters other than a priority parameter on the basis of the priority parameter when the setting unit obtains an input of the priority parameter, the priority parameter being one of the plurality of photographing parameters; and a display control unit causing the display unit to display designable ranges after the change made by the designable range changing unit.

A microscope system according to another aspect of the present invention includes: a microscope obtaining the microscope image of a sample; and a photographing apparatus photographing the microscope image, wherein the photographing apparatus includes: a photographing control unit controlling an imager under a predetermined photographing condition so as to photograph an observation image that is the microscope image and that is formed on the light receiving surface of the imager; a setting unit obtaining the input of a plurality of photographing parameters, determining a photographing condition on the basis of the obtained photographing parameters, and setting this condition for the photographing control unit; a display unit displaying designable ranges of the photographing parameters; a designable range changing unit changing designable ranges of the plurality of photographing parameters other than a priority parameter on the basis of the priority parameter when the setting unit obtains an input of the priority parameter, the priority parameter being one of the plurality of photographing parameters; and a display control unit causing the display unit to display designable ranges after the change made by the designable range changing unit.

BRIEF DESCRIPTION OF THE DRAWINGS

The present invention will be more apparent from the following detailed description when the accompanying drawings are referenced.

FIG. 2 shows time charts each showing a relationship between a synchronization signal generated by a synchronization signal generation unit and a drive signal of a CCD image sensor generated by a TG (timing generator).

FIG. 3 is a diagram schematically showing mutual-constraint relationships between photographing parameters.

FIG. 5 is a flowchart showing a process of a photographing condition setting process.

FIG. 7 is a flowchart showing a process of a second example of the photographing condition derivation/adjustment process.

FIG. 8 is a diagram showing a second example of the configuration of a microscope system including a photographing apparatus implementing the present invention.

FIG. 12 is a time chart showing a relationship between signals at the time of an image displacement operation.

DESCRIPTION OF THE PREFERRED EMBODIMENTS

Embodiments of the present invention will be described on the basis of the drawings. However, the embodiments presented below only illustrate a photographing apparatus for embodying the technical ideas of the present invention. Therefore, embodiments of the present invention are not limited to those described below.

In each of the drawings, elements with like functions are given like numerals so that similar descriptions are not given repeatedly.

In the present embodiment, a CCD image sensor is used as an imager; and as a technique for a partial reading by a CCD image sensor, a photographing apparatus for a microscope which employs the high-speed sweeping described in Japanese Laid-open Patent Publication No. 2004-104561 introduced above will be described as an example. However, the present invention can also be implemented using a technique other than the high-speed sweeping as a way to perform the partial reading by a CCD image sensor. In addition, as an example, the present invention can also be implemented using, as an imager, a CCD image sensor that can easily perform partial reading.

Figure 1:
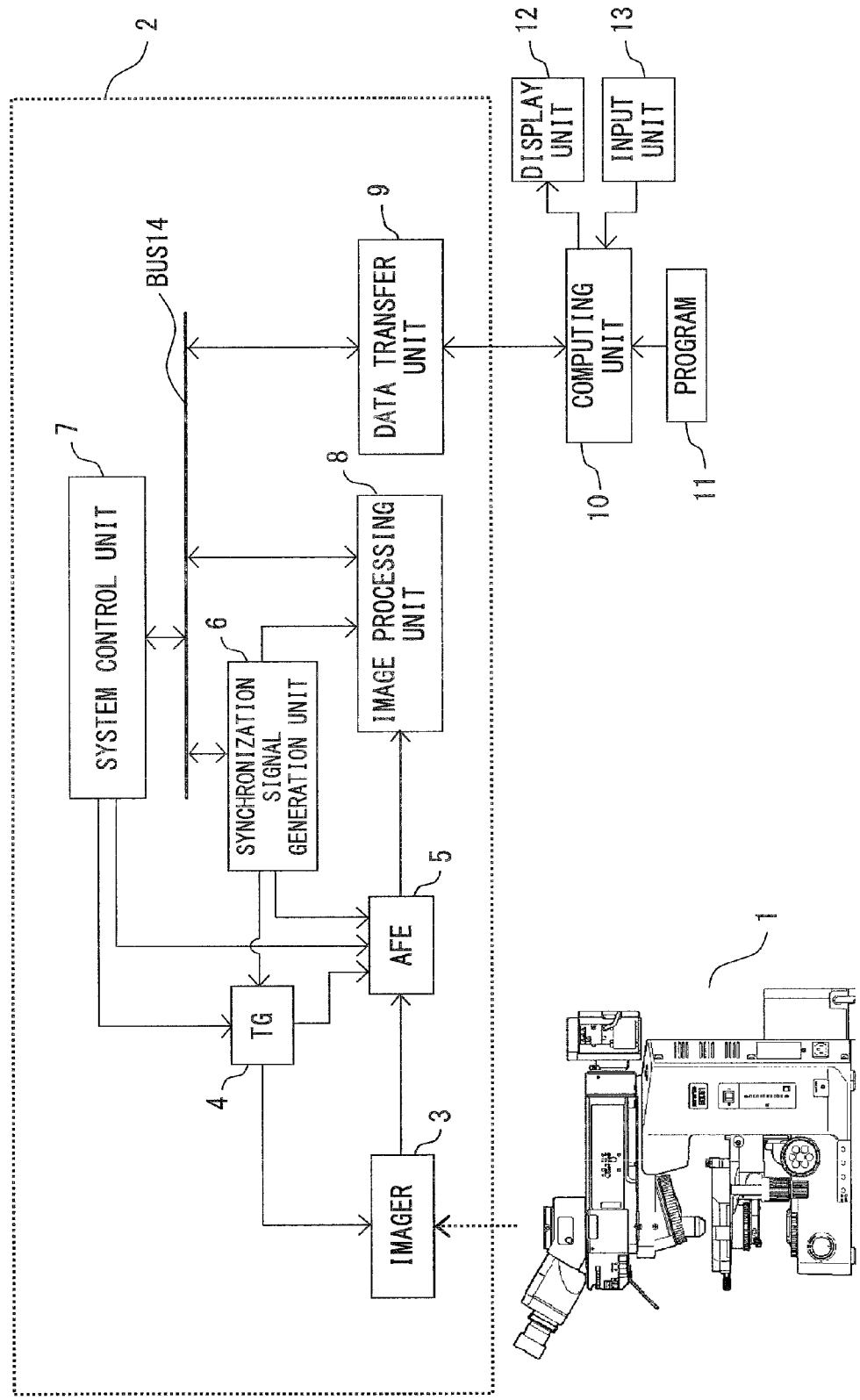
FIG. 1 is a diagram showing a first example of the configuration of a microscope system including a photographing apparatus implementing the present invention.

First, FIG. 1 will be described. FIG. 1 shows the first example of the configuration of a microscope system including a photographing apparatus implementing the present invention.

In FIG. 1, a microscope 1 has a three-dimensionally movable stage and an objective lens, which are arranged facing each other. A sample is placed on this stage. Using an ocular lens via an objective lens, the observation image of this sample can be observed by the naked eye. The observation image (microscopic image) of this sample can be photographed using a photographing apparatus 2.

The photographing apparatus 2 comprises an imager 3, a timing generator (TG) 4, a preprocessing unit (analog front end: AFE) 5, a synchronization signal generation unit 6, a system control unit 7, an image processing unit 8, and a data transfer unit 9. The photographing apparatus 2 is connected to a computer (PC). This computer comprises a computing unit 10 that operates in accordance with a program 11, a display unit 12, and an input unit 13. The synchronization signal generation unit 6, the system control unit 7, the image processing unit 8, and the data transfer unit 9 are all connected to a bus, and can send and receive various kinds of data among themselves under the management by the system control unit 7.

The imager 3, which is a CCD image sensor, photographs the image of a sample (not shown) observed by the microscope 1 and formed on the light receiving surface of the imager 3, and outputs an electronic signal representing the acquired image to AFE 5.

TG 4 is a drive signal generator for driving the imager 3 and AFE 5 at a predetermined timing that is synchronized with a vertical synchronization signal VD and horizontal synchronization signal HD generated by the synchronization signal generation unit 6. Specifically, TG 4 outputs, as drive signals for the imager 3, a vertical transfer clock $V\phi$ that drives a vertical electric-charge transfer path of the imager 3, a horizontal transfer clock $H\phi$, that drives a horizontal electric-charge transfer path, a reset gate signal RG that resets an output amplifier of the imager 3, and the like. In addition, TG 4 forcibly discharges, to the semiconductor substrate, electric charges generated and accumulated by light receiving elements arranged on the light receiving surface of the imager 3, and generates an electronic shutter pulse SUB (hereinafter referred to as "SUB pulse") that stops the accumulation of electric charges. TG 4 controls an exposure time of photographing by the imager 3 in accordance with the output period of the SUB pulse. When TG 4 receives from the system control unit 7 a control signal that orders the selection of a reading method (all-pixel reading mode, partial reading mode, pixel addition (binning) mode, and the like) for electric charges accumulated at the imager 3, TG 4 outputs a drive signal that corresponds to the selected method. In addition, TG 4 outputs, as drive signals for AFE 5, a clock for correlated double sampling, a clock for A/D conversion, and the like.

AFE 5 receives an electronic signal output from the imager 3, and performs noise component removing and level adjustment to this electronic signal which is an analog signal, by performing correlated double sampling. Then, AFE 5 performs A/D conversion (analog-digital conversion). After this, AFE 5 outputs, to the image processing unit 8, image data, which is digital data representing the image photographed by the imager 3. Note that AFE 5 receives the drive signal described above from TG4, and receives the adjusted value by the level adjustment from the system control unit 7 and a synchronization signal from the synchronization signal generation unit 6.

The synchronization signal generation unit 6 generates a vertical synchronization signal VD and horizontal synchronization signal HD and outputs them to TG 4, AFE 5, the system control unit 7, and the image processing unit 8. Here, the cycle of the vertical synchronization signal VD is set on the basis of a VD cycle set value output from the system control unit 7. In addition, the cycle of the vertical synchronization signal VD is set in accordance with the reading method (indicated by the system control unit 7) for electric charges accumulated at the imager 3. In, for example, the partial reading mode, the cycle of the vertical synchronization signal VD is set in accordance with the range (position and size) of the partial reading.

When the system control unit 7 receives an instruction regarding photographing conditions (reading method, cycle of vertical synchronization signal, exposure time, partial reading region, and the like) sent from the computing unit 10 via the data transfer unit 9, the system control unit 7 reports a reading method corresponding to the instruction to TG 4 and the synchronization signal generation unit 6. In addition, the system control unit 7 derives an output period of a SUB pulse in accordance with a VD cycle set value and the exposure time corresponding to the instruction regarding photographing conditions, so as to set the derived output period for TG 4 and set an adjusted value by the level adjustment for AFE 5.

A photographing control unit is configured to control the imager 3 under a predetermined photographing condition using TG 4, AFE 5, the synchronization signal generation unit 6, and the system control unit 7 above so that the image of a sample observed by the microscope and formed on the light receiving surface of the imager 3 is photographed.

The image processing unit 8 applies image processing, such as noise reduction and correction of gray-scale gradation, to the image represented by image data output from AFE 5, and then outputs this image to the data transfer unit 9.

The data transfer unit 9 transfers to the system control unit 7 a photographing condition output from the computing unit 10 operating in accordance with the program 11. When the data transfer unit 9 receives image data to which image processing has been applied by the image processing unit 8, it transfers the data to the computing unit 10.

The computing unit 10, which is an arithmetic processing unit, operates in accordance with the program 11. By executing the program 11, the computing unit 10 performs various control processes, such as obtaining various instructions input via the input unit 13 by a user, transferring a photographing condition to the data transfer unit 9, and displaying on the display unit 12 an image represented by the image data transferred from the data transfer unit 9. These control processes also include a setting process in which the input of a plurality of photographing parameters described later is obtained; photographing conditions are determined on the basis of the obtained photographing parameters; and these photographing conditions are set for the photographing control unit. These control processes also include a designable range changing process, a display control process, and the like, which will be described later.

The program 11 is stored in a storage device (not shown). By reading and executing the program 11 from the storage device, the computing unit 10 can achieve various control operation processes.

The display unit 12 is, for example, a liquid crystal display device. The display unit 12 performs displaying of an image represented by image data which the computing unit 10 receives from the photographing apparatus 2, displaying of a designable range of a photographing parameter described later, and the like.

The input unit 13 is, for example, a pointing device, such as a mouse device, or a keyboard device. The input unit 13 obtains the input of various instructions from the user which are associated with the user's operation, and transfers these instructions to the computing unit 10.

Next, an interrelationship will be described between a reading region, frame rate, cycle of a vertical synchronization signal, and exposure time, which are photographing parameters serving as bases for determining some of the photographing conditions when the imager 3 is made to photograph an image. These photographing parameters are input via the input unit 13 by a user. On the basis of these input photographing parameters, the computing unit 10 determines a photographing condition in accordance with the program 11. The determination result of the photographing condition is sent from the computing unit 10 via the data transfer unit 9 to the photographing unit of the photographing apparatus 2.

Next, FIG. 2 will be described. FIG. 2 is a time chart indicating the relationship between a synchronization signal that is generated by the synchronization signal generation unit 6 and a drive signal that is generated by TG 4 and drives the CCD image sensor (i.e., the imager 3).

In FIG. 2, (a) indicates time charts of drive signals for a CCD image sensor in the case of selecting an all-pixel reading mode as a method for reading accumulated electric charges. The time charts in (a) respectively indicate a vertical synchronization signal VD, horizontal synchronization signal HD, vertical transfer clock V$\phi$, and electrical shutter pulse SUB, which are placed in this order starting from the top.

The vertical transfer clock V$\phi$ is a signal that can take three values, VH, VM and VL, ordered here with the higher voltage coming first. Every time VH is applied to the CCD image sensor, electric charges generated and accumulated by a light receiving element are transferred to a vertical transfer path (i.e., a path for vertically transferring electric charges). Every time VM and VL are alternately applied to the CCD image sensor, the electric charges are sequentially transferred to a horizontal transfer path (i.e., a path for horizontally transferring electric charges).

The period in which a SUB pulse is not output (i.e., the "EXP" period in the drawing) is a period in which, in accordance with the intensity of light incident on light receiving elements arranged on the light receiving surface of the CCD image sensor, the light receiving elements accumulate electric charges which they generate. Therefore, by changing the length of the EXP period, exposure time can be controlled when photographing is performed using the CCD image sensor.

In FIG. 2, (b) and (c) indicate time charts of drive signals for a CCD image sensor at the time of selecting a partial reading mode as a method for reading accumulated electric charges. Here, period "A" indicated in (b) is a period in which a high-speed sweeping operation is performed and period "B" is a period in which a normal sweeping operation is performed. In addition, (c) highlights the relationship between the horizontal synchronization signal HD and the vertical transfer clock V$\phi$ in the period A (i.e., the relationship at the time of performing the high-speed sweeping operation). During period A, the CCD image sensor performs an operation in which electric charges corresponding to one horizontal transfer path are transferred, and then N (N>1) electric charges are transferred from N vertical transfer paths to this horizontal transfer path and are mixed.

Next, the operation of the CCD image sensor at the time of selecting the all-pixel reading mode as a reading method for accumulated electric charges will be described.

First, electric charges generated and accumulated by the light receiving elements arranged on the light receiving surface are sequentially sent to an output amplifier via the vertical transfer paths and horizontal transfer paths. The output amplifier converts the sent electric charges into voltages which have a proportional relationship with the amount of these electric charges, and sequentially outputs these voltages. Meanwhile, cycle VDP of the vertical synchronization signal VD is time needed to output electric charges of all of the pixels constituting one image frame (i.e., reading time). Therefore, when the all-pixel reading mode is selected, cycle VDP [sec] of the vertical synchronization signal VD is the product of cycle HDP [sec] of the horizontal synchronization signal HD and the number (H) of horizontal scanning lines (i.e., the number of vertical pixels of the CCD image sensor). In other words, cycle VDP [sec] of the vertical synchronization signal VD can be determined in the following formula [1].

$$VDP = H \times HDP \quad [1]$$

Then, when exposure time EXP is shorter than cycle VDP of the vertical synchronization signal VD as shown in FIG. 2, frame rate FR [fps] is the reciprocal of the cycle VDP. Accordingly, frame rate FR [fps] can be determined in the following formula [2].

$$FR = 1/VDP \quad [2]$$

By contrast, when exposure time EXP is longer than cycle VDP of the vertical synchronization signal VD, this exposure time will cover a plurality of cycles of the vertical synchronization signal VD. In this situation, frame rate FR [fps] can be determined in the following formula [3].

$$FR = 1/\{VDP \times ceil(EXP/VDP)\} \quad [3]$$

In formula [3] above, function ceil(X) is a function that determines the smallest integer of the numbers greater than or equal to X.

Next, the operation of the CCD image sensor at the time of selecting the partial reading mode as a reading method for accumulated electric charges will be described.

As described above, in regard to the lines other than those for the partial reading region, when the partial reading mode is selected, the CCD image sensor performs the high-speed sweeping in which N (N>1) electric charges are transferred from N vertical transfer paths to a horizontal transfer path and are mixed. Therefore, the cycle VDP of the vertical synchronization signal VD at the time of selecting the partial reading mode will be shorter than the one at the time of selecting the all-pixel reading mode.

Here, the relationship between cycle VDP of the vertical synchronization signal VD and height RH of an ROI (i.e. the number of vertical pixels in a rectangular ROI of the CCD image sensor) satisfies the following formula [4].

$$VDP = \{RH + ceil((H-RH)/N)\} \times HDP \quad [4]$$

As with the case of selecting the all-pixel reading mode, frame rate FR at the time of selecting the partial reading mode is determined by formula [3] or [4] above depending on the magnitude relationship between exposure time EXP and cycle VDP of the vertical synchronization signal VD.

As indicated by formulas [2], [3] and [4] above, frame rate FR at the time of selecting the partial reading mode depends on height RH of an ROI and exposure time EXP. By contrast, frame rate FR does not depend on the width of an ROI (i.e., the number of horizontal pixels in a rectangular ROI of the CCD image sensor) or the position of the ROI.

As described above, the photographing parameters above have a relationship such that when a value of a certain photographing parameter is determined, the maximum designable values of the other photographing parameters are determined; accordingly, the upper designable ranges are limited. FIG. 3 schematically shows the relationship between the photographing parameters (this relationship will be hereinafter referred to as "mutual-constraint relationship").

In regard to FIG. 3, assume, for example, that the value of frame rate FR is determined first.

In this situation, when the value of frame rate FR is determined, the value of cycle VDP of the vertical synchronization signal VD is determined on the basis of formula [2]. The value of cycle VDP of the vertical synchronization signal VD will be referred to as "VDPfr".

In order to photograph an image on the basis of the determined value of frame rate FR, exposure time EXP must be equal to or lower than VDPfr. In other words, VDPfr will be the maximum value of exposure time EXP that can be set.

On the basis of formula [4], the value of height RH of the ROI will also be determined from VDPfr. The determined value here will be the maximum value of height RH of the ROI.

As described above, when the value of frame rate FR is determined, the upper limits of the settable ranges of exposure time. EXP and height RH of an ROI will be limited.

Next, as another example, assume that the value of height RH of the ROI is determined first.

In this situation, the value of cycle VDP of the vertical synchronization signal VD is determined on the basis of formula [4]. The determined value here will be referred to as VDProi. Here, exposure time EXP must be equal to or lower than VDProi. In other words, VDProi will be the maximum value of exposure time EXP that can be set.

On the basis of formula [2], the value of frame rate FR will also be determined from VDProi. The determined value here is the maximum value that can be set to provide the value above of height RH of the ROI.

As described above, when the value of height RH of the ROI is determined, the upper limits of the settable ranges of exposure time EXP and frame rate FR will be limited.

Next, as another example, assume that the value of exposure time EXP is determined first.

In this situation, the value of exposure time EXP is the minimum value of cycle VDP of the vertical synchronization signal VD. The value here of exposure time EXP will be referred to as VDPexp.

On the basis of formula [2], the maximum value of settable frame rate FR will also be determined from VDPexp. In addition, on the basis of formula [4], the maximum value of settable height RH of the ROI will be determined from VDexp.

As described above, when the value of exposure time EXP is determined, the upper limits of the settable ranges of frame rate FR and height RH of the ROI will be limited.

As described above, the photographing parameters, i.e., exposure time EXP, frame rate FR, and height RH of the ROI, have a mutual-constraint relationship.

Figure 4:
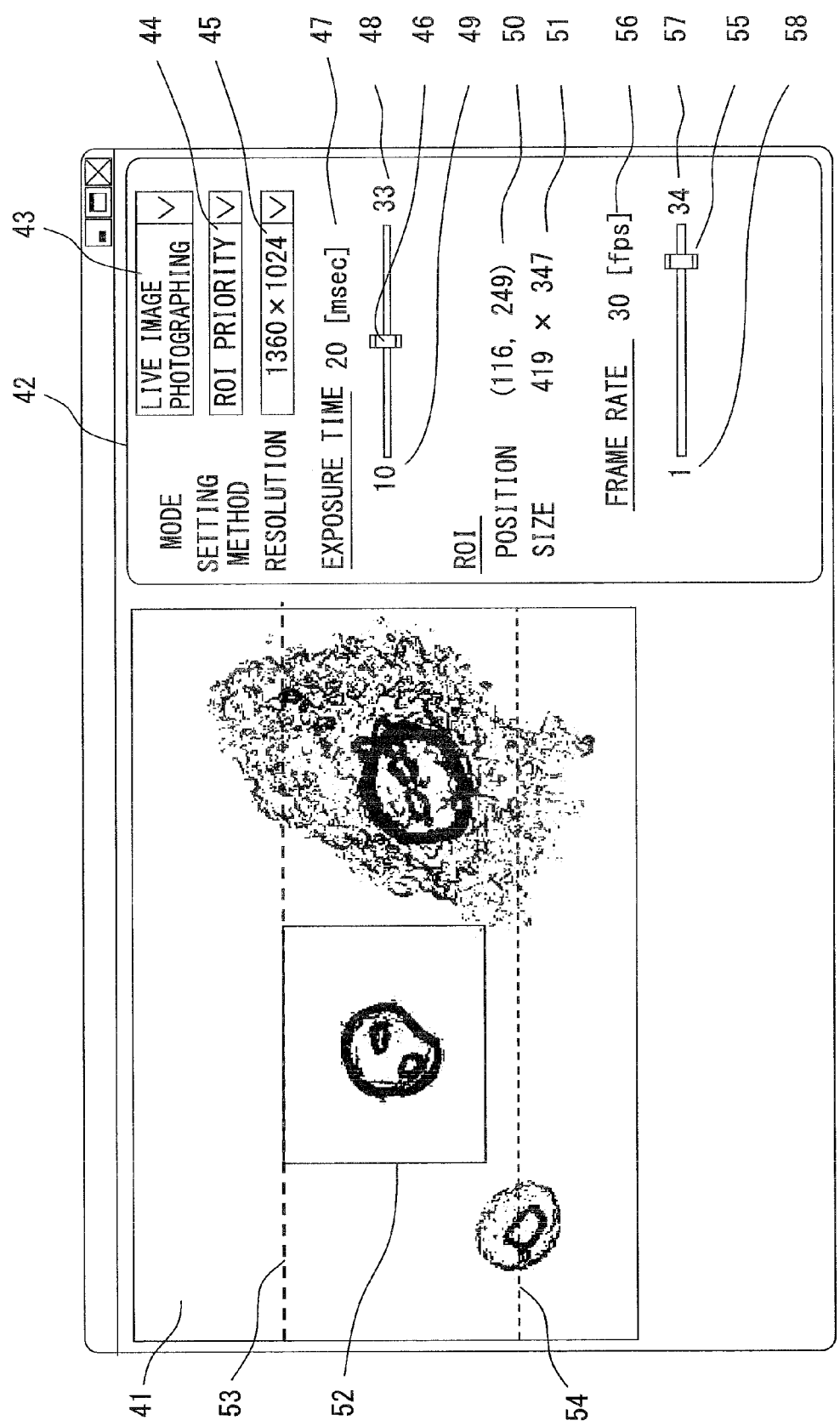
FIG. 4 is a diagram showing a first example of the display screen of the display unit.

Next, a technique for displaying a photographing parameter on the display unit 12 will be described using FIG. 4. FIG. 4 shows a first example of the display screen of the display unit 12.

In the screen example of FIG. 4, a graphical user interface (hereinafter referred to as "GUI") is provided in cooperation with the input unit 13.

The position, shape, display method, size, colors and the like of each of the GUI components (such as entry fields, buttons, and track bars) in the screen example of FIG. 4 can be appropriately changed. It is also possible to appropriately change the configuration of the GUI such that the area for displaying an observation image and that for setting a photographing parameter are displayed in different windows, such that a plurality of screens are displayed in the same window, and the like.

The screen example of FIG. 4 is composed of a display window 41 for displaying the image of a photographed observation image and a setting box 42 used to set photographing parameters.

A frame 52 and broken lines 53 and 54 displayed in the display window 41 respectively represent an ROI and the upper boundary and the lower boundary of the area in which the ROI can set. In the ROI photographing that will be described later, an image (ROI image) in the region of the frame 52 from among observation images displayed in a superimposed method is photographed. Here, the designation of the position and size of the frame 52, i.e., the designation of the position and size of the ROI, can be changed by a user operating the input unit 13, and these designations can be changed only within the region indicated by the broken lines 53 and 54. As described above, the frame 52 and broken lines 53 and 54 are used to set an ROI that is one of the photographing parameters.

The setting box 42 includes a photographing mode selection combo box 43, a setting mode selection combo box 44, a resolution selection combo box 45, an ROI coordinate label 50, an ROI size label 51, and GUI components for setting various photographing parameters.

The photographing mode selection combo box 43 is used to select a photographing mode, such as live image, still image, or time lapse photographing.

The setting mode selection combo box 44 is used to select a set value to be preferentially designated from among the photographing parameters, i.e., exposure time, ROI, and frame rate. The photographing parameters other than the photographing parameter selected in the setting mode selection combo box 44 (hereinafter referred to as "priority parameter") are limited to being within the designable range on the basis of the set value of the priority parameter.

The resolution selection combo box 45 is used to select the resolution of an observation image. The selection candidates of the resolution of the resolution selection combo box 45 are determined in accordance with the reading method (such as all images, binning, image displacement, and partial reading) of accumulated electric charges of the imager 3.

In order to set exposure time EXP, which is one of the photographing parameters, the setting box 42 includes an exposure time setting track bar 46, an exposure time label 47, a longest exposure time label 48, and a shortest exposure time label 49.

The exposure time setting track bar 46 is used to designate the set value of exposure time, and the exposure time label 47 indicates the set value of the designated exposure time. The longest exposure time label 48 and the shortest exposure time label 49 respectively indicate the upper limit and lower limit of the set value of exposure time that can be set using the exposure time setting track bar 46. The user can designate only a set value of exposure time which is within the range indicated by the upper limit and lower limit displayed as the longest exposure time label 48 and shortest exposure time label 49.

The position of the frame 52 in the display window 41 and its size determine the XY coordinate value that indicates the position of the ROI on the light receiving surface of the imager 3, and determine the size of this ROI. The ROI coordinate label 50 and ROI size label 51 show this XY coordinate value and the size of this ROI, respectively. In the screen example of FIG. 4, the ROI coordinate label 50 indicates X coordinate "116" and Y coordinate "249", and the ROI size label 51 indicates width "419" and height (RH) "347".

In order to set frame rate FR, which is one of the photographing parameters, the setting box 42 includes a frame rate setting track bar 55, a frame rate label 56, a maximum frame rate label 57, and a minimum frame rate label 58.

The frame rate setting track bar 55 is used to designate the set value of a frame rate, and the frame rate label 56 indicates the designated set value of a frame rate. The maximum frame rate label 57 and the minimum frame rate label 58 respectively indicate the upper limit and lower limit of the set value of frame rate that can be set using the frame rate setting track bar 55. The user can designate only a set value of frame rate that is within the range indicated by the upper limit and lower limit displayed as the maximum frame rate label 57 and minimum frame rate label 58.

As described above, the screen example of FIG. 4 displays the photographing parameters (i.e., frame rate FR, exposure time EXP, and the parameter for identifying an ROI of the light receiving surface of the imager 3 on which an image displayed in an ROI image is formed) applied when the imager 3 photographs an ROI image. In addition, this screen example displays the designable range of the set value of each of these photographing parameters.

Next, a photographing condition setting process performed by the computing unit 10 will be described with reference to FIG. 5. FIG. 5 is a flowchart showing this photographing condition setting process. The computing unit 10 can perform this photographing condition setting process by executing the program 11.

First, in step 1 in FIG. 5, the setting and displaying process for initial values of photographing conditions is performed.

In this process, initial values of photographing conditions (photographing mode="live image photographing", reading method="all-pixel reading", cycle of vertical synchronization signal=VDP that is applied when "live image photographing" is selected together with "all-pixel reading" and that is calculated from formula [1]) are transmitted to the system control unit 7. When the system control unit 7 receives the initial values, it sets a photographing mode and reading method for TG 4 and sets a vertical synchronization signal cycle VDP for the synchronization signal generation unit 6, causing the imager 3 to start photographing an image over the entirety of the light receiving surface.

In this process, a displaying process is also performed for causing the display unit 12 to display the image of a photographed sample observed using the microscope 1 and the initial values of the photographing conditions. Through this displaying process, the display window 41 in the screen example of FIG. 4 displays the observation image and the frame 52 indicating an ROI. At this moment, the frame 52 encloses the entirety of the image displayed in the display window 41, and this indicates that the ROI is set to be "entire visual field".

Next, in step 2, it is determined whether or not the partial reading used when an image in the ROI is photographed has been selected as a method for reading accumulated electric charges of the imager 3. When the screen example of FIG. 4 is used as a GUI, this determination is made depending on whether or not the resolution of an observation image which is set at the time of using the partial reading method has been selected at the resolution selection combo box 45, as a method for reading accumulated electric charges of imager 3.

When it is determined in the determination process of step 2 that the partial reading has been selected (determination result is Yes), the process proceeds to step 3. By contrast, when it is determined in the determination process of step 2 that the partial reading has not been selected (i.e., the selection of the reading method has not changed) (determination result is No), the process proceeds to step 4.

In step 3, the imager 3 is controlled so that it reads accumulated electric charges via the partial reading as a method for reading accumulated charges of the imager 3, and photographs an image in the ROI (ROI image) (i.e., ROI photographing is performed in step 3).

In this process, a setting process is performed in which the input of a plurality of photographing parameters is obtained; photographing conditions are determined on the basis of the obtained photographing parameters; and the determined photographing conditions are set for the photographing control unit described above. In other words, the computing unit 10 first obtains, as photographing parameter inputs from a user, the position and size of an ROI, exposure time EXP, and frame rate FR, which are designated on the screen of FIG. 4 at the time of execution of this process. Then, on the basis of exposure time EXP and frame rate FR from among these parameters, the computing unit 10 calculates a vertical synchronization signal cycle VDP from formula [2] or [3] introduced above. After this, the obtained position and size of the ROI and exposure time EXP and the calculated vertical synchronization signal cycle VDP are transmitted to the system control unit 7 as photographing conditions. When the system control unit 7 receives these initial values, it sets for TG 4 a photographing mode (here "live image photographing") and the photographing conditions above and sets for the synchronization signal generation unit 6 the vertical synchronization signal cycle VDP above. Accordingly, the imager 3 photographs a region of interest image (i.e., ROI image), which is the image relating to a portion of the light receiving surface (ROI) in an observation image of a sample observed by the microscope 1.

When the ROI photographing process in step 3 is completed, the processes of FIG. 5 terminate.

Meanwhile, in step 4, on the basis of the user's operation toward the input unit 13, it is determined whether or not the designation regarding the set value of a priority parameter of the photographing parameters displayed on the display unit 12 has been changed. If the screen example of FIG. 4 is used as a GUI, the priority parameter is a photographing parameter selected using the setting mode selection combo box 44, as described above. When it is determined in step 4 that the designation regarding the set value of the priority parameter has been changed (i.e., when the determination result is Yes), the process proceeds to step 5. By contrast, when it is determined in step 4 that the designation regarding the set value of the priority parameter has not been changed (i.e., when the determination result is No), the process returns to step 2 and the process described above is performed again.

Next, in step 5, a photographing condition derivation/adjustment process is performed. In this process, a designable range changing process is performed first in which the designable range of a photographing parameter which has a mutual-constraint relationship with the priority parameter whose change of the designation regarding the set value was detected in step 4 is changed on the basis of the result of the designation change of the priority parameter. Then, if the set value of a photographing parameter designated at this moment is not within the designable range due to the designable range changing process above, then an adjustment process is performed in which this set value is adjusted to be within the range.

Depending on a priority parameter selected, different processes are performed in this photographing condition derivation/adjustment process. Details of these processes will be described later.

Next, in step 6, a display control process is performed in which the designable range of a set value of each of the photographing parameters in the screen of FIG. 4 currently displayed on the display unit 12 and the set value of each of the photographing parameters are updated to be changed into the range and set value reflecting the processing result of step 5; and the range and set value after the change made in step 5 are displayed. After the completion of the display control process, the process returns to step 2 and the processes described above are performed again.

The processes described so far are included in the photographing condition setting process.

Figure 6:
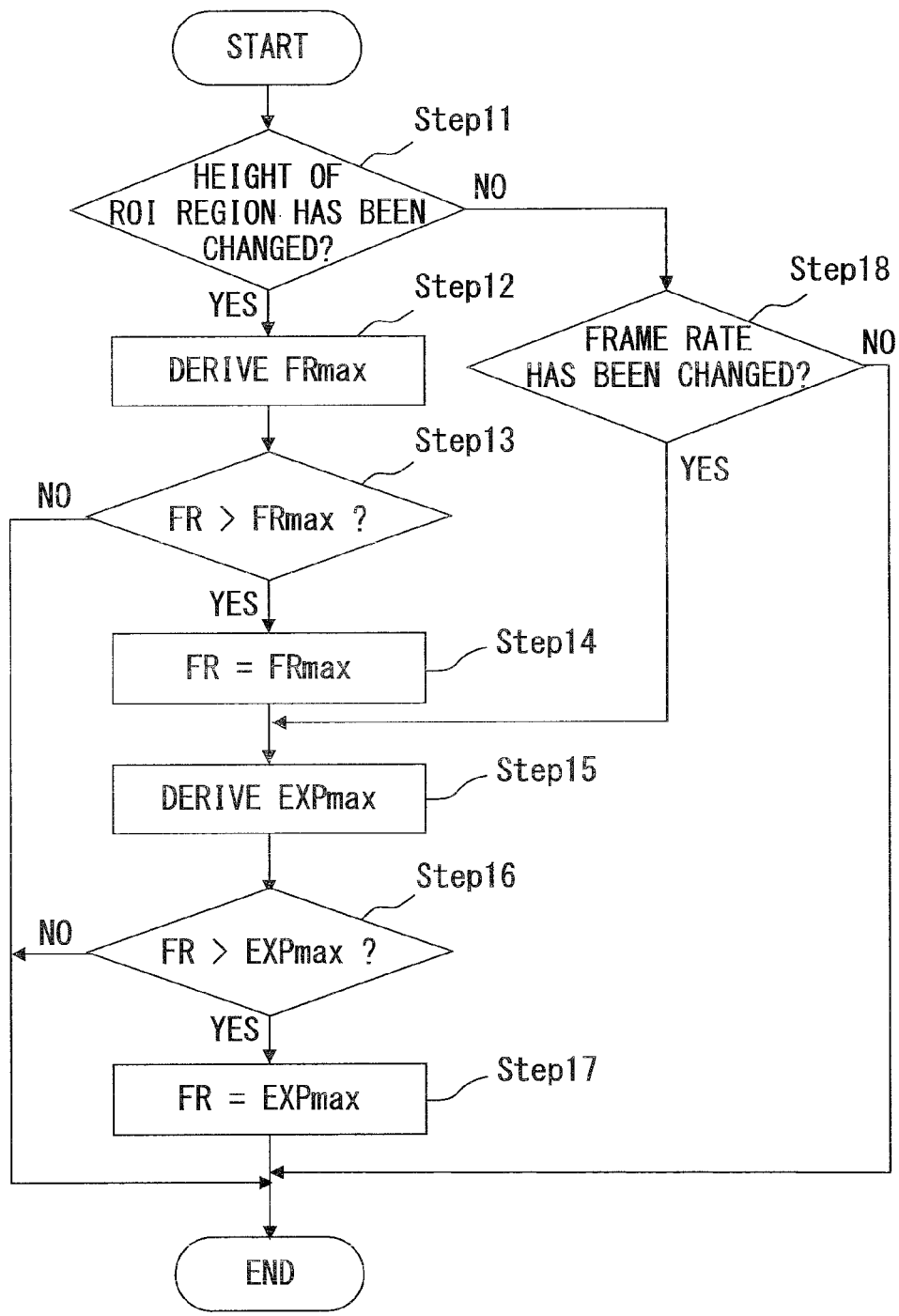
FIG. 6 is a flowchart showing a process of a first example of the photographing condition derivation/adjustment process.

Next, FIG. 6 will be described. FIG. 6 is a flowchart showing a first example of the photographing condition derivation/adjustment process performed in step 5 of FIG. 5. In the first example, as a priority parameter, a parameter for identifying an ROI is selected by the setting mode selection combo box 44.

When a parameter for identifying an ROI is selected as a priority parameter, the values for this selection are displayed at both ends of each of the track bars in the display process performed in step 1 of FIG. 5 described above. In other words, the maximum frame rate label 57 indicates frame rate FR (determined from formulas [1] and [2] introduced above) applied when "live image photographing" via "all-pixel reading" is selected, and the minimum frame rate 58 indicates a value that is settled in accordance with the specification of the photographing apparatus 2. The longest exposure time label 48 displays a VDP determined by the set frame rate FR being substituted into formula [2] (i.e., VDPfr described above), and the shortest exposure time label 49 displays a value that is settled on in accordance with the specification of the photographing apparatus 2.

Next, the processes of FIG. 6 will be described under the condition in which, in step 4 of FIG. 5, the photographing parameter relating to an ROI is changed by a user operating the input unit 13 so as to change the ROI frame 52 or so as to change the set value of the ROI coordinate label 50 or the ROI size label 51.

First, in step 11, it is determined whether or not the changed photographing parameter was height RH of the ROI region. When it is determined that height RH of the ROI region has been changed (i.e., when the determination result is Yes), the process proceeds to step 12. When it is determined that height RH of the ROI region has not been changed (i.e., when the determination result is No), the process proceeds to step 18.

In step 18, it is determined whether or not the designated set value of a frame rate has been changed (this change is made by a user operating the input unit 13 so as to move the indicator of the frame rate setting track bar 55). When it is determined that the designated set value of a frame rate has been changed (i.e., when the determination result is Yes), the process proceeds to step 15. By contrast, when it is determined that the designated set value of a frame rate has not been changed (i.e., when the determination result is No), the process of FIG. 6 is terminated and the process is returned to FIG. 5.

In step 12, a vertical synchronization signal cycle VDP (i.e., VDProi described above) is calculated by substituting height RH after the change into formula [4]; and the maximum value of frame rate FR determined by substituting VDProi into formula [2] is also calculated. This maximum value will be referred to as maximum frame rate FRmax.

Next, in step 13, it is determined whether or not the designated set value of frame rate FR indicated at this moment by the frame rate label 56 in the screen example of FIG. 4 is greater than maximum frame rate FRmax. When it is determined that the set value of frame rate FR is greater than maximum frame rate FRmax (i.e., when the determination result is Yes), the process proceeds to step 14. By contrast, when it is determined that the set value of frame rate FR is not greater than maximum frame rate FRmax (i.e., when the determination result is No), the process of FIG. 6 is terminated and the process is returned to FIG. 5.

In step 14, an adjustment process is performed in which the set value of frame rate FR is made to be identical with maximum frame rate FRmax. In this process, the designated set value of frame rate FR is adjusted so that it is within the designable range after the change.

In step 15, a vertical synchronization signal cycle VDP (i.e., VDPfr described above) is calculated by substituting the set value of frame rate FR at this moment into formula [2]; and this calculated value is set as the maximum value of designable exposure time EXP. This maximum value will be referred to as longest exposure time EXPmax.

Next, in step 16, it is determined whether or not the designated set value of exposure time EXP indicated at this moment by the exposure time label 47 in the screen example of FIG. 4 is greater than longest exposure time EXPmax. When it is determined that the set value of exposure time EXP is greater than longest exposure time EXPmax (i.e., when the determination result is Yes), the process proceeds to step 17. By contrast, when it is determined that the set value of exposure time EXP is not greater than longest exposure time EXPmax (i.e., when the determination result is No), the process of FIG. 6 is terminated and the process is returned to FIG. 5.

In step 17, an adjustment process is performed in which the set value of exposure time EXP is made to be identical with longest exposure time EXPmax. In this process, the designated set value of exposure time EXP is adjusted so that it is within the designable range after the change. After this adjustment process is completed, the process of FIG. 6 is terminated and the process of FIG. 5 is started again.

The first example of the photographing condition derivation/adjustment process consists of the processes described so far. In the display control process in step 6 of FIG. 5 performed after the photographing condition derivation/adjustment process, the maximum frame rate FRmax and longest exposure time EXPmax derived from the process of FIG. 6 are displayed in the maximum frame rate label 57 and longest exposure time label 48, respectively. In addition, if frame rate FR and exposure time EXP are adjusted in the process of FIG. 6, then the frame rate setting track bar 55, frame rate label 56, exposure time setting track bar 46, and exposure time label 47 are updated so that they indicate values after the adjustment.

If the designated set value of exposure time is changed by a user operating the input unit 13 so as to move the indicator of the exposure time setting track bar 46, then the determination results of both steps 11 and 18 of FIG. 6 are "No" and the process moves to step 6 of FIG. 5. In this situation, the exposure time label 47 is updated in the display control process of step 6 so that it indicates the set value of exposure time after the change of designation.

Next, FIG. 7 will be described. FIG. 7 is a flowchart showing a second example of the photographing condition derivation/adjustment process in step 5 of FIG. 5. In this second example, a frame rate is selected as a priority parameter by the setting mode selection combo box 44.

When a frame rate is selected as a priority parameter, the values for this selection are displayed at both ends of each of the track bars in the display process performed in step 1 of FIG. 5 described above. In other words, the maximum frame rate label 57 indicates the maximum value of frame rate FR (determined from formulas [1] and [2] introduced above) applied when the "live image photographing" via the "partial reading" is selected, and the minimum frame rate 58 indicates a value that is settled in accordance with the specification of the photographing apparatus 2. The longest exposure time label 48 displays a VDP determined by the set frame rate FR being substituted into formula [2] (i.e., VDPfr described above), and the shortest exposure time label 49 displays a value that is settled in accordance with the specification of the photographing apparatus 2.

Next, the processes of FIG. 7 under the condition in which, in step 4 of FIG. 5, the photographing parameter relating to an ROI is changed by a user moving the frame rate setting track bar 55 or changing the set value of the frame rate label 56 so as to change the photographing parameter relating to frame rate FR, will be described.

First, in step 21, it is determined whether or not the changed photographing parameter was frame rate FR. When it is determined that frame rate FR has been changed (i.e., when the determination result is Yes), the process proceeds to step 22. When it is determined that frame rate FR has not been changed (i.e., when the determination result is No), the process of FIG. 7 is terminated and the process is returned to FIG. 5.

Then, in step 22, a vertical synchronization signal cycle VDP (i.e., VDPfr described above) is calculated by substituting frame rate FR after the change into formula [2]; this calculated VDP is set as a maximum value of the settable exposure time EXP. This maximum value will be referred to as a longest exposure time EXPmax. In addition, an ROI height RH is calculated by substituting the calculated vertical synchronization signal cycle VDP into formula [4], and this height RH is set as a maximum value of ROI height RH. This maximum value of ROI height RH will be referred to as a maximum value RHmax.

Next, in step 23, it is determined whether or not the designated set value of ROI height RH indicated at this moment by the ROI size label 51 in the screen example of FIG. 4 is greater than maximum value RHmax of the ROI height. When it is determined that the set value of height RH is greater than maximum value RHmax of the height (i.e., when the determination result is Yes), the process proceeds to step 24. By contrast, when it is determined that the set value of height RH is not greater than maximum value RHmax of the height (i.e., when the determination result is No), the process proceeds to step 25.

In step 24, an adjustment process is performed in which the set value of ROI height RH is made to be identical with maximum value RHmax of the height. In this process, the designated set value of ROI height RH is adjusted so that it is within the designable range after the change.

Next, in step 25, it is determined whether or not the designated set value of exposure time EXP indicated at this moment by the exposure time label 47 in the screen example of FIG. 4 is greater than longest exposure time EXPmax. When it is determined that the set value of exposure time EXP is greater than longest exposure time EXPmax (i.e., when the determination result is Yes), the process proceeds to step 26. By contrast, when it is determined that the set value of exposure time EXP is not greater than longest exposure time EXPmax (i.e., when the determination result is No), the process of FIG. 7 is terminated and the process is returned to FIG. 5.

In step 26, an adjustment process is performed in which the set value of exposure time EXP is made to be identical with longest exposure time EXPmax. In this process, the designated set value of exposure time EXP is adjusted so that it is within the designable range after the change. After this adjustment process is completed, the process of FIG. 7 is terminated and the process is returned to FIG. 5.

The processes described so far are included in the second example of the photographing condition derivation/adjustment process. In the display control process in step 6 of FIG. 5 performed after the photographing condition derivation/adjustment process, the maximum value RHmax of ROI height derived from the process of FIG. 7 is displayed in correspondence with the distance between the broken lines 53 and 54. Longest exposure time EXPmax derived from the process of FIG. 7 is indicated by the longest exposure time label 48. If the set value of ROI height RH and exposure time EXP were adjusted in the process of FIG. 7, then the frame 52, ROI size label 51, exposure time setting track bar 46, and exposure time label 47 are updated so that they correspond to values after the adjustment.

If the designated set value of exposure time is changed by a user operating the input unit 13 so as to move the indicator of the exposure time setting track bar 46, then the determination result of step 21 in FIG. 7 is "No" and the process moves to step 6 of FIG. 5. In this situation, the exposure time label 47 is updated in the display control process of step 6 so that it indicates the set value of exposure time after the change of designation. If the designated set value of ROI height RH is changed by a user operating the input unit 13 so as to change the size of the frame 52, then the determination result of step 21 in FIG. 7 is also "No" and the process moves to step 6 of FIG. 5. In this situation, the ROI size label 51 is updated in the display control process of step 6 so that it indicates the set value of ROI height RH after the change of designation.

As described above, using the photographing apparatus in FIG. 1 according to the present embodiment, photographing parameters having mutual relationships can be efficiently set.

In regard to formulas [1] to [4] above, which indicate mutual relationships between photographing parameters, instead of directly calculating the photographing parameters, the computing unit 10 can determine them by referring to a table indicating the numeral relationships between the photographing parameters if these numeral relationships are calculated and recorded in such a table in advance.

Next, FIG. 8 will be described. FIG. 8 shows a second example of the configuration of a microscope system including a photographing apparatus implementing the present invention.

The only difference between the configuration of FIG. 8 and the configuration of the first example in FIG. 1 is that the configuration of FIG. 8 further includes a light-quantity control unit 15.

The light-quantity control unit 15 controls the quantity of illumination light illuminating a sample placed on the stage of the microscope 1. Change in this quantity of light leads to a change in luminance of the image of a sample observed by the microscope 1 and formed on the light receiving surface of the imager 3.

Figure 9:
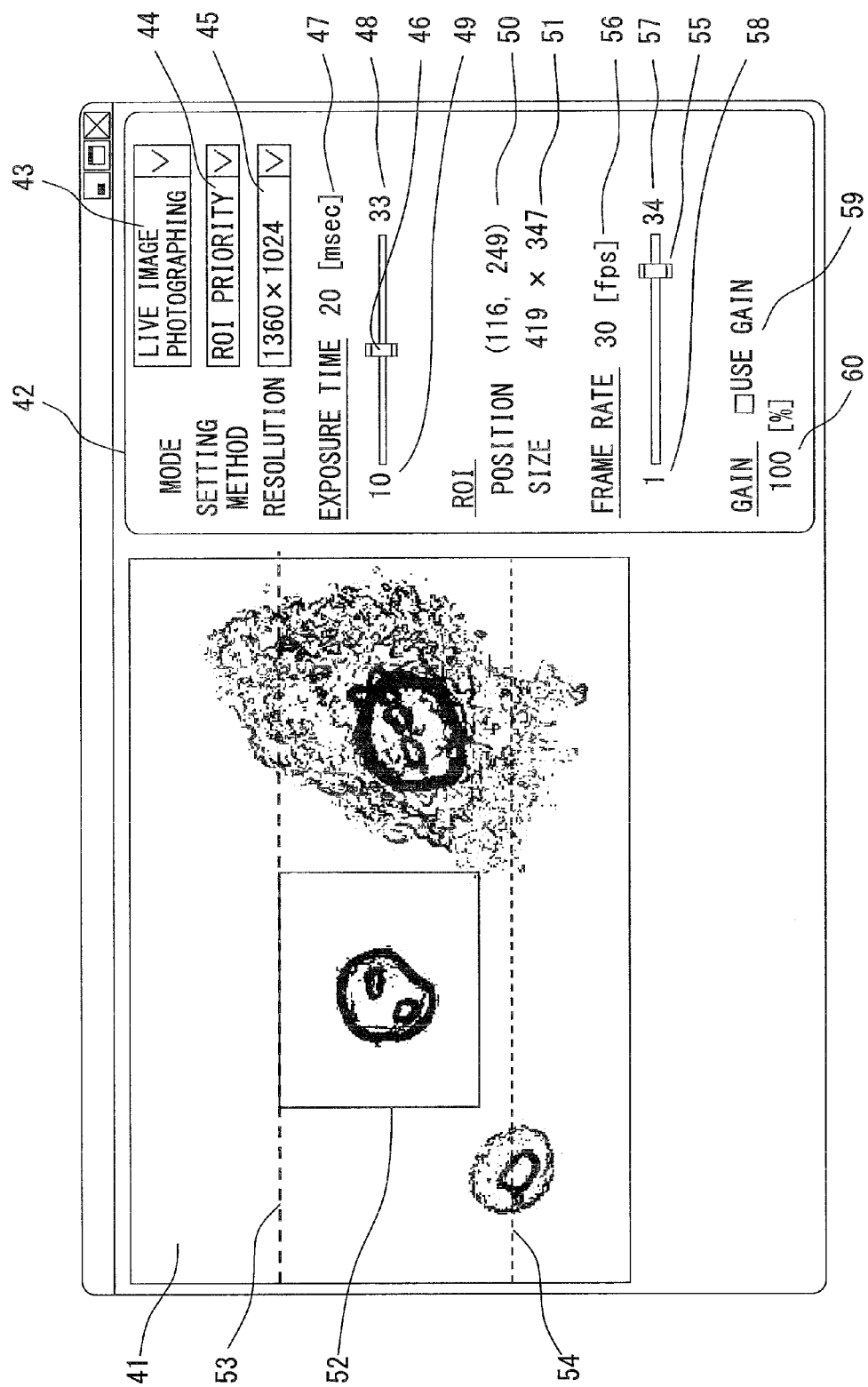
FIG. 9 is a diagram showing a second example of the display screen of the display unit.

Next, FIG. 9 will be described. FIG. 9 is a diagram showing a second example of the display screen of the display unit 12. The second example is displayed by the display unit 12 of the microscope system shown in FIG. 8. A GUI is provided in cooperation with the input unit 13.

The only difference between the screen example of FIG. 9 and the screen example of the first example in FIG. 4 is that the setting box 42 in the screen example of FIG. 9 further includes a gain check box 59 and gain label 60.

The gain check box 59 is used to receive an instruction indicating need or no need for a process for changing the luminance of an image photographed by the imager 3. The gain label 60 displays a value that indicates the change amount (i.e., amplification degree) of the luminance of the image.

Next, a photographing condition setting process performed by the computing unit 10 of the microscope system shown in FIG. 8 will be described.

This photographing condition setting process is essentially the same as that given in the flowcharts of FIGS. 5, 6 and 7. However, this photographing condition setting process is a little different in regard to step 17 of FIG. 6 and step 26 of FIG. 7.

When the set value of exposure time EXP is greater than longest exposure time EXPmax, the computing unit 10 in FIG. 1 performs an adjustment process in step 17 of FIG. 6 and step 26 of FIG. 7 such that the set value of exposure time EXP is identical with the longest exposure time EXPmax. In other words, in this adjustment process, the set value of exposure time EXP is decreased; therefore, if photographing is performed by performing such an adjustment only, the light quantity will not be sufficient and a dark image will be obtained.

Figure 10:
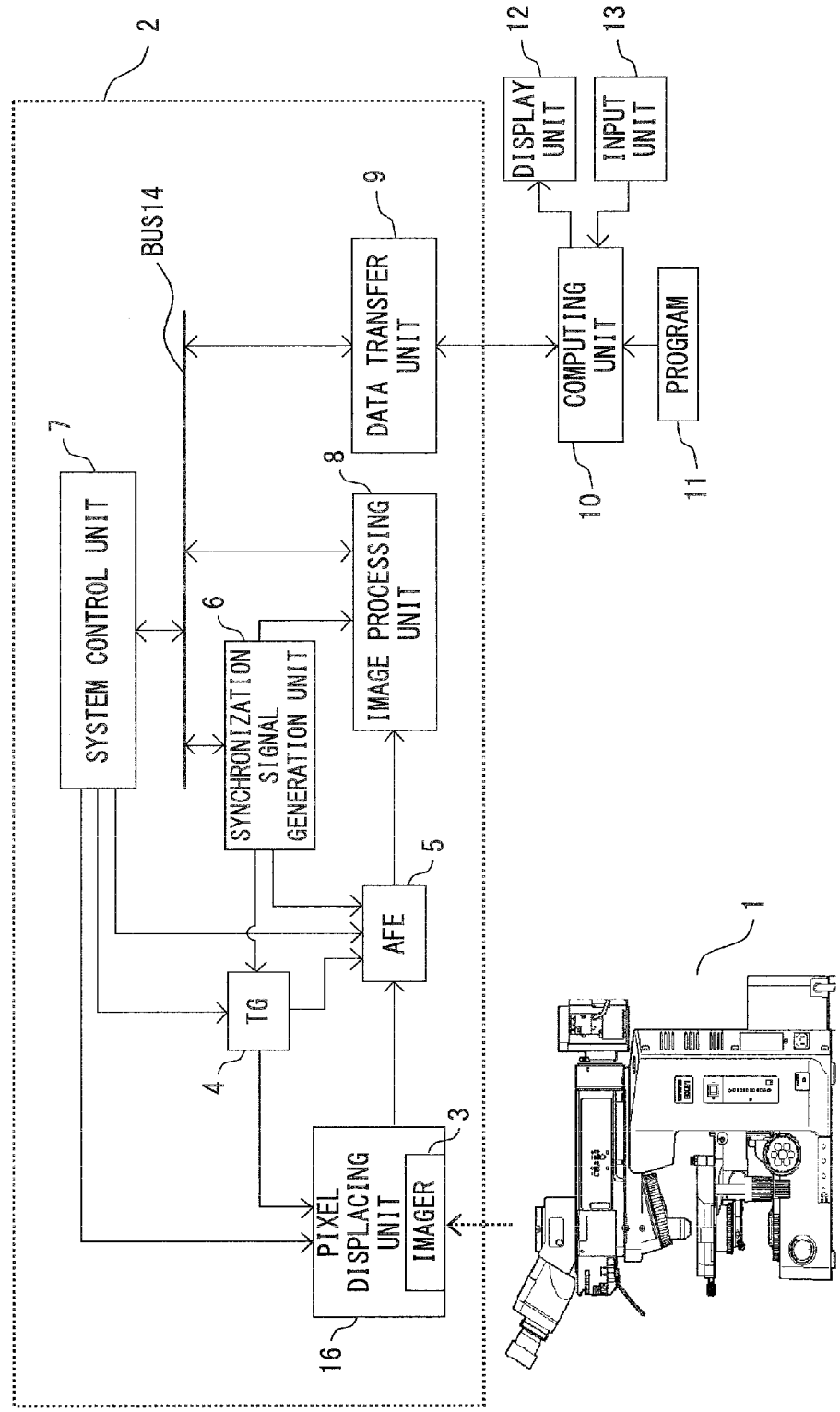
FIG. 10 is a diagram showing a third example of the configuration of a microscope system including a photographing apparatus implementing the present invention.

By contrast, in such a situation, the computing unit 10 in FIG. 10 performs further processes in step 17 of FIG. 6 and step 26 of FIG. 7 such that an instruction to increase the quantity of illumination light illuminating a sample is given to the light quantity control unit 15. When the light quantity control unit 15 receives this instruction, it performs control so as to increase the quantity of the illumination light. More specifically, as an example, in order to control the fading of fluorescent dye introduced into a sample when fluorescence observation is performed, the light quantity control unit 15 increases the quantity of illumination light by changing the combination of ND filters inserted in an illumination light path. This compensates for the deficiency in light quantity for photographing which is caused by decreasing the set value of exposure time EXP to longest exposure time EXPmax.

Instead of configuring a microscope system as in FIG. 8 in which the light quantity control unit 15 is controlled as described above, deficiency in light quantity for photographing can also be compensated for by causing the image processing unit 8 in the configuration of FIG. 1 to perform an image process for changing the luminance of an image photographed by the imager 3.

In other words, in step 17 of FIG. 6 and step 26 of FIG. 7, the computing unit 10 in FIG. 1 is further caused to give an instruction to the image processing unit 8 so as to perform an image process for increasing the luminance of an image photographed by the imager 3. When the image processing unit 8 receives this instruction, it performs, for the photographed image, the image process corresponding to this instruction. Amplification factor Gain (i.e., increment of luminance) for this image process is calculated by the following formula [5].

$$\text{Gain} = \text{EXP}/\text{EXPmax} \qquad [5]$$

In formula [5], the value of exposure time EXP is the set value before it is adjusted to be identical with longest exposure time EXPmax.

Instead of causing the image processing unit 8 to perform the image process for increasing the luminance of an image photographed by the imager 3, the computing unit 10 in FIG. 1 can also perform such a process by itself.

Next, FIG. 10 will be described. FIG. 10 shows a third example of the configuration of a microscope system including a photographing apparatus implementing the present invention.

The only difference between the configuration of FIG. 10 and the configuration of the first example shown in FIG. 1 is that the configuration of FIG. 10 further includes a pixel displacement unit 16.

Relative to a light flux coming from the microscope 1 and incident on the imager 3, the pixel displacement unit 16 moves the relative position of the imager 3 to a plurality of predetermined positions in a predetermined order. More specifically, the pixel displacement unit 16 receives from the system control unit 7 a control signal that indicates the amount of horizontal or vertical pixel displacement, and horizontally or vertically displaces the physical position of the imager 3 in accordance with this control signal. The image displacement unit 16 is configured with, for example, a piezoelectric displacement element. If the image displacement unit 16 comprises such a piezoelectric displacement element, then the system control unit 7 will output, to the image displacement unit 16, a voltage signal as a control signal corresponding to the amount of pixel displacement.

In the configuration of FIG. 10, every time the pixel displacement unit 16 performs pixel displacement, the imager 3 photographs the image of a sample observed by the microscope 1 and formed on the light receiving surface; therefore, the image processing unit 8 can receive a plurality of images each corresponding to a different photographing position. After this, a further image combining process is performed in which the plurality of images are combined so as to generate an image that has a higher resolution than an image that would be obtained by performing photographing while the imager 3 is being fastened. This image combining process will be described with reference to FIGS. 11 and 12.

Figure 11:
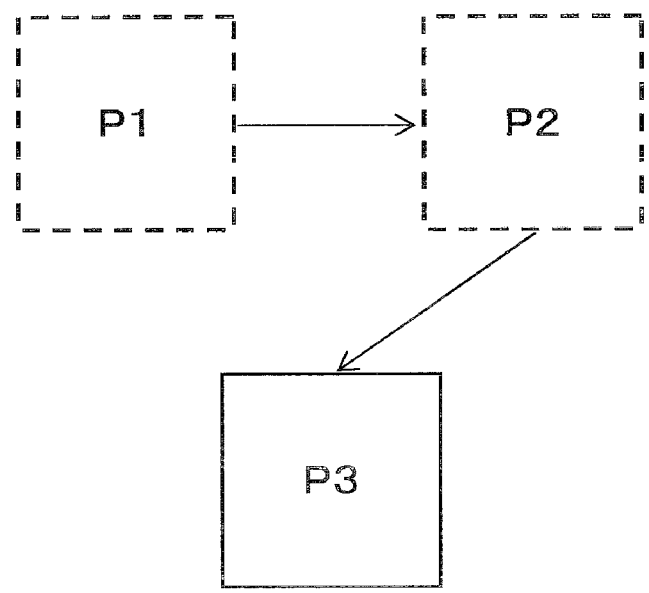
FIG. 11 is a diagram illustrating a synthesizing process for an image obtained via an image displacement operation.

In FIG. 11, positions P1, P2 and P3 indicate examples of photographing positions at which the imager 3 is located when the pixel displacement unit 16 performs an image displacement operation. Position P1 indicates the initial position of the imager 3. Position P2 is ½ pixel to the right of initial position P1. Position P3 is ¼ pixel away from initial position P1 in the horizontal direction and is (√3)/4 pixel away from initial position P1 in the vertical direction.

Next, image obtaining operations performed at positions P1, P2 and P3 by a CCD image sensor (i.e., imager 3) will be described with reference to the time chart in FIG. 12.

The time chart in FIG. 12 indicates a vertical synchronization signal VD, electronic shutter pulse SUB, the position of the imager 3, electric-charge accumulation state of the imager 3, and output of the imager 3, which are ordered in this order from the top.

In FIG. 12, in period A1, exposure is performed at initial position P1 in accordance with the exposure time that was set and electric charges generated from the light receiving element of the imager 3 are accumulated. In the following period, period B1, the electric charges accumulated in period A1 are output from the imager 3 as image information and voltage applied to the pixel displacement unit 16 (here, this is a voltage conversion element) is controlled to move the imager 3 from initial position P1 to position P2.

In period A2, exposure is performed at position P2 in accordance with the exposure time that was set and electric charges generated from the light receiving element of the imager 3 are accumulated. In the following period, period B2, the electric charges accumulated in period A2 are output from the imager 3 as image information and voltage applied to the pixel displacement unit 16 is controlled to move the imager 3 from position P2 to position P3.

In period A3, exposure is performed at position P3 in accordance with the exposure time that was set and electric charges generated from the light receiving element of the imager 3 are accumulated. In the following period, period B3, the electric charges accumulated in period A3 are output from the imager 3 as image information and voltage applied to the pixel displacement unit 16 is controlled to move the imager 3 from position P3 to initial position P1.

In the following processes, by repeating the exposure, output of accumulated electric charges, and moving of the imager 3 described above, the imager 3 is caused to photograph the image at positions P1, P2 and P3. In this way, when the relative position of the imager 3 relative to the light flux coming from the microscope 1 and incident on the imager 3 is one of a plurality of predetermined positions, the photographing control unit causes the imager 3 to photograph the observation image of a sample which this light flux forms on the light receiving surface of the imager 3. Then, the image processing unit 8 combines a plurality of images obtained via the photographing by the imager 3, so that a high-resolution observation image of the sample is generated. This generated image has a higher resolution than the images before the combining.

As described above, in the combining process for the images obtained from the pixel displacement operation indicated in FIGS. 11 and 12, three images obtained via the imager 3 performing photographing at three positions are combined to obtain one high-resolution image. Therefore, the reciprocal of the length of the time period that starts when period A1 in FIG. 12 starts and ends when period B3 ends is the frame rate of a high-resolution image. As described above, the lengths of periods A1, A2 and A3 are determined in accordance with the setting of exposure time. It should be noted that although the lengths of periods B1, B2 and B3 are determined in accordance with exposure time and the height of a partial reading region (i.e., ROI), these lengths of the periods cannot be made shorter than the length of time needed to move the position of the imager 3 when the pixel displacement unit 16 performs a pixel displacement operation.

The photographing condition setting process performed by the computing unit 10 of the microscope system of FIG. 10 is essentially the same as that in the flowcharts in FIGS. 5, 6 and 7. However, the photographing condition setting process performed by the computing unit 10 of the microscope system of FIG. 10 is different in that when maximum frame rate FRmax is determined, the time needed to move the position of the imager 3 for a pixel displacement operation is further considered as described above. In other words, on the basis of the priority parameter described above and also the time needed to move a relative position as described above, the computing unit 10 changes the designable range of a parameter for determining a frame rate used when the imager 3 photographs an observation image.

FIG. 11 indicates one example of pixel displacement. Accordingly, it should be noted that the positions for pixel displacement and the number of photographed images are not limited to being those indicated in FIG. 11.

As described above, in the microscope system of FIG. 10, before performing photographing of a high-resolution image for which a pixel displacement operation is used, time needed to obtain the image can be realized. The time needed to obtain the image can also be realized when a partial reading region is changed. Therefore, it is possible to realize, in advance, the frame rate for a high-resolution time-lapse observation in which a high-resolution moving image of a sample is obtained by repeatedly performing the photographing of high-resolution images.

As described above, in all of the microscope systems according to the embodiments described above, when a user changes a certain photographing parameter, the settable range of another photographing parameter having a mutual relationship with the changed parameter is derived and the set value of this derived parameter is adjusted. Then, the display unit 12 displays the derived settable range and the adjusted value of the photographing parameter so that the user can see them. In this way, the user can set a photographing parameter of the photographing apparatus 2 using an interactive method; therefore, the photographing parameters having a mutual relationship can be set efficiently.

The present invention is not limited to the embodiments described above. When the present invention is implemented, various changes can be made without departing from the spirit of the invention.

What is claimed is:

1. A microscope system comprising:
a microscope obtaining a microscope image of a sample; and
a photographing apparatus photographing the microscope image, wherein the photographing apparatus comprises:
a photographing control device controlling an imager under a predetermined photographing condition so that the imager photographs an observation image that is the microscope image and that is formed on a light receiving surface of the imager;
a setting unit obtaining inputs of a plurality of photographing parameters, determining a photographing condition on the basis of the obtained photographing parameters, and setting the photographing condition for the photographing control device;
a display unit displaying a designable region of the photographing parameters;
a designable range changing unit changing a designable range of the plurality of photographing parameters other than a priority parameter on the basis of the priority parameter when the setting unit obtains an input of the priority parameter, the priority parameter being one of the plurality of photographing parameters;
a display control unit causing the display unit to display a designable range after the change made by the designable range changing unit; and
an adjustment unit adjusting and changing a designated value into a value within the designable range after the change made by the designable range changing unit when the designated value is out of the designable range due to the change made by the designable range changing unit, the designated value being one of the inputs of the photographing parameters which have been obtained by the setting unit.

2. A photographing apparatus comprising:
a photographing control device controlling an imager under a predetermined photographing condition so that the imager photographs an observation image of a sample observed by a microscope and formed on a light receiving surface of the imager;
a setting unit obtaining inputs of a plurality of photographing parameters, determining a photographing condition on the basis of the obtained photographing parameters, and setting the photographing condition for the photographing control device;
a display unit displaying a designable region of the photographing parameters;
a designable range changing unit changing a designable range of the plurality of photographing parameters other than a priority parameter on the basis of the priority parameter when the setting unit obtains an input of the priority parameter, the priority parameter being one of the plurality of photographing parameters;
a display control unit causing the display unit to display a designable range after the change made by the designable range changing unit; and
an adjustment unit adjusting and changing a designated value into a value within the designable range after the change made by the designable range changing unit when the designated value is out of the designable range due to the change made by the designable range changing unit, the designated value being one of the inputs of the photographing parameters which have been obtained by the setting unit.

3. The photographing apparatus according to claim 2, wherein:
   the photographing control unit controls the imager so that it photographs a region of interest image that is an image relating to a portion of the light receiving surface in the observation image; and
   one of the plurality of photographing parameters is a parameter for identifying a region of the light receiving surface in which an image displayed in the region of interest image is formed.

4. The photographing apparatus according to claim 3, wherein one of the plurality of photographing parameters is a parameter for determining a frame rate applied when the imager photographs the region of interest image or a parameter for determining an exposure time applied when the imager photographs the region of interest image.

5. The photographing apparatus according to claim 2, further comprising a light quantity insufficiency compensation unit compensating for, when the imager photographs the observation image, a light quantity insufficiency due to a shortening of an exposure time of the imager photographing the observation image, the light quantity insufficiency being caused when the adjustment unit adjusts a parameter for determining the exposure time and when the exposure time is shortened by the adjustment.

6. The photographing apparatus according to claim 5, wherein the light quantity insufficiency compensation unit compensates for the light quantity insufficiency by increasing a quantity of illumination light to the sample or by performing an image process for increasing a luminance of the image photographed by the imager.

7. The photographing apparatus according to claim 2, further comprising
   a pixel displacement unit moving a relative position of the imager relative to a light flux incident on the imager to a plurality of predetermined positions in a predetermined order, wherein:
   when the relative position is at one of the plurality of predetermined positions, the photographing control unit causes the imager to photograph the observation image which the light flux forms on the light receiving surface of the imager;
   the photographing apparatus further comprises a high-resolution image generation unit combining a plurality of images obtained via the photographing control unit causing the imager to perform photographing, so as to generate a high-resolution image of the observation image which has a higher resolution than the plurality of images obtained; and
   when a designable range of a parameter for determining a frame rate, that is applied when the observation image is photographed by the imager, is changed, the designable range changing unit changes the designable range on the basis of both the priority parameter and a time needed to move the relative position via the image displacement unit.

8. A photographing apparatus comprising:
photographing control means for controlling an imager under a predetermined photographing condition so that the imager photographs an observation image of a sample observed by a microscope and formed on a light receiving surface of the imager;
setting means for obtaining inputs of a plurality of photographing parameters, for determining a photographing condition on the basis of the obtained photographing parameters, and for setting the photographing condition for the photographing control means;
display means for displaying a designable region of the photographing parameter;
designable range changing means for changing a designable range of the plurality of photographing parameters other than a priority parameter on the basis of the priority parameter when the setting means obtains an input of the priority parameter, the priority parameter being one of the plurality of photographing parameters;
display control means for causing the display means to display a designable range after the change made by the designable range changing means; and
an adjustment unit adjusting and changing a designated value into a value within the designable range after the change made by the designable range changing unit when the designated value is out of the designable range due to the change made by the designable range changing unit, the designated value being one of the inputs of the photographing parameters which have been obtained by the setting unit.

* * * * *